United States Patent
Levinson et al.

(10) Patent No.: US 11,019,132 B2
(45) Date of Patent: May 25, 2021

(54) SYSTEM AND METHOD FOR PERFORMING FAST FILE TRANSFERS WITH DYNAMIC BANDWIDTH PROVISIONING

(71) Applicant: R-Stor Inc., Saratoga, CA (US)

(72) Inventors: Roger Levinson, San Jose, CA (US); Damian Kowalewski, Sunnyvale, CA (US)

(73) Assignee: R-STOR INC., Saratoga, CA (US)

( * ) Notice: Subject to any disclaimer, the term of this patent is extended or adjusted under 35 U.S.C. 154(b) by 0 days.

(21) Appl. No.: 16/542,811

(22) Filed: Aug. 16, 2019

(65) Prior Publication Data

US 2020/0007611 A1 Jan. 2, 2020

Related U.S. Application Data

(63) Continuation-in-part of application No. 16/435,305, filed on Jun. 7, 2019.

(60) Provisional application No. 62/692,434, filed on Jun. 29, 2018, provisional application No. 62/719,331, filed on Aug. 17, 2018.

(51) Int. Cl.
*H04L 29/08* (2006.01)
(52) U.S. Cl.
CPC .............. *H04L 67/06* (2013.01); *H04L 67/02* (2013.01); *H04L 67/1097* (2013.01)
(58) Field of Classification Search
CPC ... H04L 45/302; H04L 47/24; H04L 43/0876; H04L 45/125; H04L 47/22; H04L 41/0896; H04L 67/02; H04L 41/083; H04L 67/06; H04L 67/1021; H04L 41/5067; H04L 47/52; H04W 84/04; H04W 28/00; H04W 28/0231; H04W 84/12; H04W 28/16
See application file for complete search history.

(56) References Cited

U.S. PATENT DOCUMENTS

| | | | |
|---|---|---|---|
| 6,549,940 B1 * | 4/2003 | Allen | H04L 41/22 709/219 |
| 7,039,709 B1 * | 5/2006 | Beadle | H04L 45/12 709/203 |
| 8,959,203 B1 * | 2/2015 | Miller | H04L 47/00 709/224 |
| 2005/0120360 A1 | 6/2005 | Makhervaks et al. | |
| 2006/0274748 A1 | 12/2006 | Nakashima et al. | |
| 2009/0019538 A1 | 1/2009 | Pandya | |

(Continued)

FOREIGN PATENT DOCUMENTS

EP 3 358 463 A1 8/2018

OTHER PUBLICATIONS

International Search Report & Written Opinion, Application No. PCT/US2019/036101, dated Sep. 27, 2019.

(Continued)

*Primary Examiner* — Hitesh Patel
(74) *Attorney, Agent, or Firm* — Orrick, Herrington & Sutcliffe LLP

(57) ABSTRACT

Systems and apparatuses for performing fast file transfers and methods for making and using the same. In various embodiments, the system advantageously can eliminate distance constraints between multi-site computational environments, provide a dramatic reduction in transfer and/or dynamically provision bandwidth on a fabric of the system among other things.

20 Claims, 3 Drawing Sheets

(56) References Cited

U.S. PATENT DOCUMENTS

| | | |
|---|---|---|
| 2012/0219014 A1* | 8/2012 | Glaeser .............. H04L 47/2491 |
| | | 370/468 |
| 2013/0151646 A1 | 6/2013 | Chidambaram et al. |
| 2016/0226951 A1 | 8/2016 | Talpey et al. |
| 2017/0251467 A1 | 8/2017 | Dame |
| 2018/0113618 A1 | 4/2018 | Chan et al. |
| 2019/0101880 A1 | 4/2019 | Guim Bernat |
| 2020/0007611 A1* | 1/2020 | Levinson ................ H04L 67/02 |

OTHER PUBLICATIONS

Bedeir, Tarick; "Basic Flow Control for RDMA Transfers", adapted from a blog post at *The Geek in the Corner*, http://www.hpcadvisorycouncil.com/pdf/vendo_content/basic-flow-control-for-rdma-transfers.pdf, pp. 1-9, (Jan. 16, 2013).

WO, International Search Report & Written Opinion, Application No. PCT/US2019/065608, dated May 15, 2020.

\* cited by examiner

SYSTEM AND METHOD FOR PERFORMING FAST FILE TRANSFERS WITH DYNAMIC BANDWIDTH PROVISIONING

CROSS-REFERENCE TO RELATED APPLICATIONS

This application is a continuation-in-part of co-pending U.S. patent application Ser. No. 16/435,305, filed on Jun. 7, 2019, which claims the benefit of, and priority to, U.S. Provisional Application Ser. No. 62/692,434, filed Jun. 29, 2018, and also claims the benefit of, and priority to, U.S. Provisional Application Ser. No. 62/719,331, filed Aug. 17, 2018, the disclosures of which are hereby incorporated herein by reference in their entireties and for all purposes.

FIELD

The present disclosure relates generally to digital data processing and more particularly, but not exclusively, to high-efficiency, high-bandwidth systems and methods for storing and rapidly moving large data sets across multiple remote locations.

BACKGROUND

Conventional legacy data transport systems allow data to be exchanged between remote system resources. While giving significant attention to the data, these data transport systems fail to focus sufficient attention on communications, particularly communications via wide area network (or WAN). The philosophy of these data transport systems is that, if the data cannot be moved "as is," the data must be compressed, manipulated, broken up or otherwise pre-processed. Pre-processing data, however, takes time, impacts compute resources and delays access to data. Furthermore, some types of data, such as previously-compressed data or encrypted data, cannot be manipulated. Attempts to over-manipulate these types of data result in a loss of integrity and data corruption.

In view of the foregoing, a need exists for an improved system and method for performing fast file transfers in an effort to overcome the aforementioned obstacles, challenges and deficiencies of conventional data processing systems.

Figure 1A:
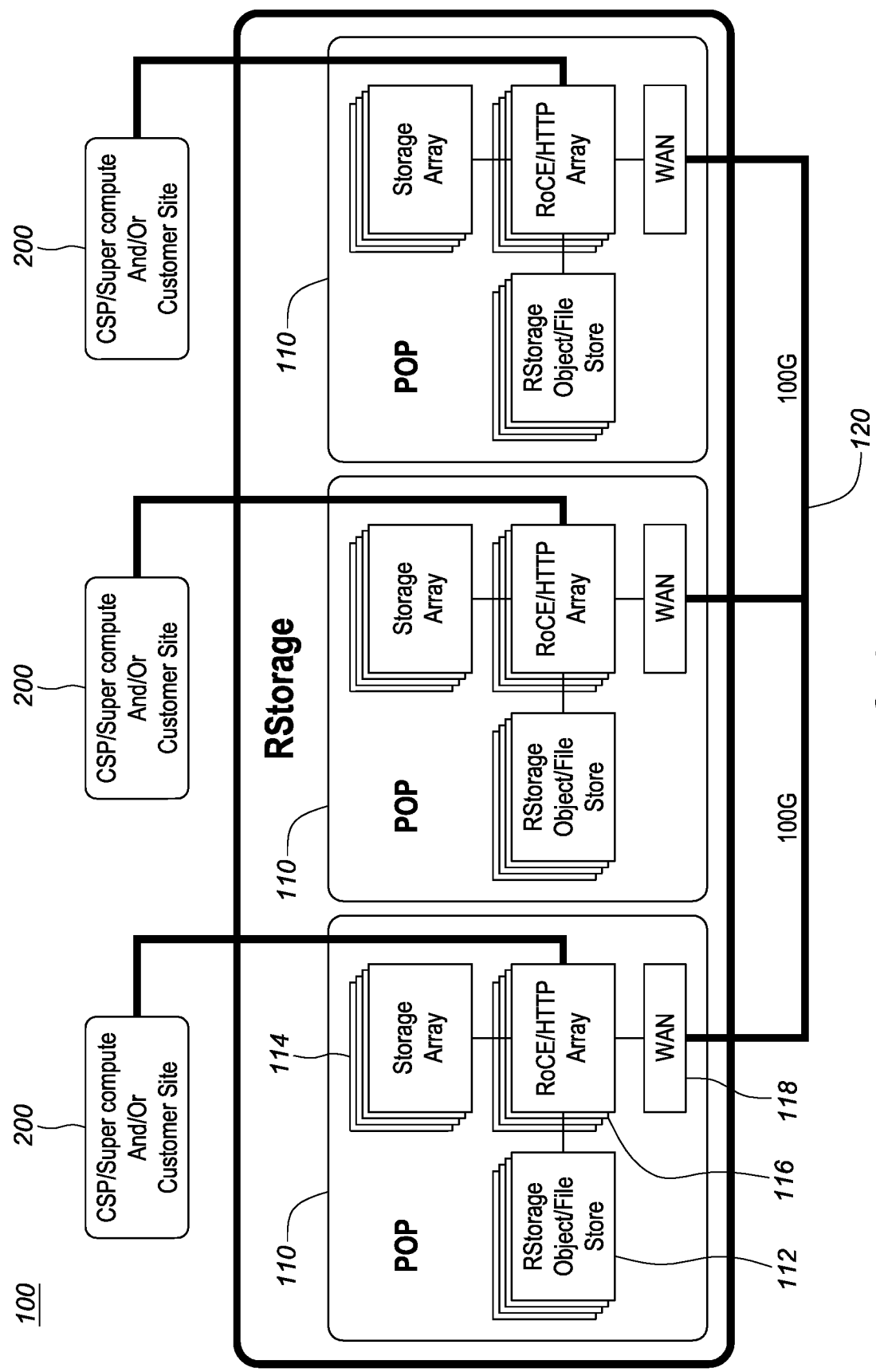
FIG. 1A is an exemplary top-level drawing illustrating an embodiment of a data storage and transfer system for storing and rapidly moving large data sets across multiple remote locations.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available legacy data transport systems require data to be compressed, manipulated, broken up or otherwise pre-processed and can result in a loss of integrity and data corruption, a high-efficiency, high-bandwidth system and method that can perform fast file transfers between private data centers and public cloud device providers can prove desirable and provide a basis for a wide range of computer applications, including cloud-based applications. This result can be achieved, according to one embodiment disclosed herein, by a data storage and transfer system 100 as illustrated in FIG. 1A.

Turning to FIG. 1A, the data storage and transfer system 100 can support a family of services riding on a high-efficiency, high-bandwidth network between private data centers and public cloud service providers. The high-efficiency, high-bandwidth network allows users to easily move and store large data sets with predictable performance and pricing. In one embodiment, the data storage and transfer system 100 advantageously allows users to move data "as is," without compressing or breaking up files. In one embodiment, if the data does not successfully transfer on a first attempted data transfer, the data storage and transfer system 100 can attempt to retransmit the data. The data storage and transfer system 100, for example, can make a predetermined number of attempts to retransmit the data and, if unsuccessful, can escalate any unsuccessful data transfer for further attention.

Selected resources of the data storage and transfer system 100 can be located outside, but accessible (preferably, securely accessible) to, one or more external network resources 200, such as cloud service providers (CSPs), such as Amazon Web Services (AWS), Azure, and Google Cloud Computing (GCP), Supercomputing Centers, such as Texas Advanced Computing Center (TACC) and San Diego Supercomputer Center (SDSC), and/or on-premises Enterprise customer sites, without limitation. The external network resources 200 can seamlessly connect with the data storage and transfer system 100 in any conventional manner, including through colocation cross connections, select metro Ethernet rings, and/or standard Internet. For a user who already owns a fiber interconnect, for example, the data storage and transfer system 100 can cross connect with an external network resource 200 of the user via a convenient colocation facility, enabling the external network resources 200 to utilize the long distance accelerated fabric of the data storage and transfer system 100. The data storage and transfer system 100 advantageously can use a fast fabric infrastructure to efficiently move data to compute and/or compute to data.

The data storage and transfer system 100 advantageously can eliminate distance constraints between multi-site computational environments. By eliminating these distance constraints, the data storage and transfer system 100 can enable secure replication of data and/or foster an environment that promotes easy collaboration between users who want access to a common pool of data over wide area distances. Data security can be further ensured, for example, via use of user keys and/or Advanced Encryption Standard (AES)-256 encryption.

The data storage and transfer system 100 preferably stores the data temporarily as needed to help ensure that the full data transfer has completed. The data then can be deleted once the data transfer is complete. The data storage and transfer system 100 likewise can provide robust, distributed file storage services for enhanced data security. With the remote mount capability of the data storage and transfer system 100, the data can be stored in a secure location with limited portions of the data being accessible for computation directly by a remote computer through Remote Direct Memory Access (RDMA). Since the data is not copied in whole and is not stored elsewhere, data sovereignty can be maintained.

The data storage and transfer system 100 can provide a dramatic reduction in transfer times versus standard Transmission Control Protocol/Internet Protocol (TCP/IP) data transfer rates without requiring significant (or, preferably, any) network changes. In selected embodiments, the data storage and transfer system 100 can utilize one or more proprietary data protocols, including RDMA, to eliminate overhead and inefficiencies inherent in transport protocols, such as TCP/IP, while maintaining routability and managing congestion and packet loss. Thereby, the data storage and transfer system 100 can provide tangible business advantages, both in terms of sheer volume of data that can be handled and the speed at which the volume of data can be moved.

Figure 2:
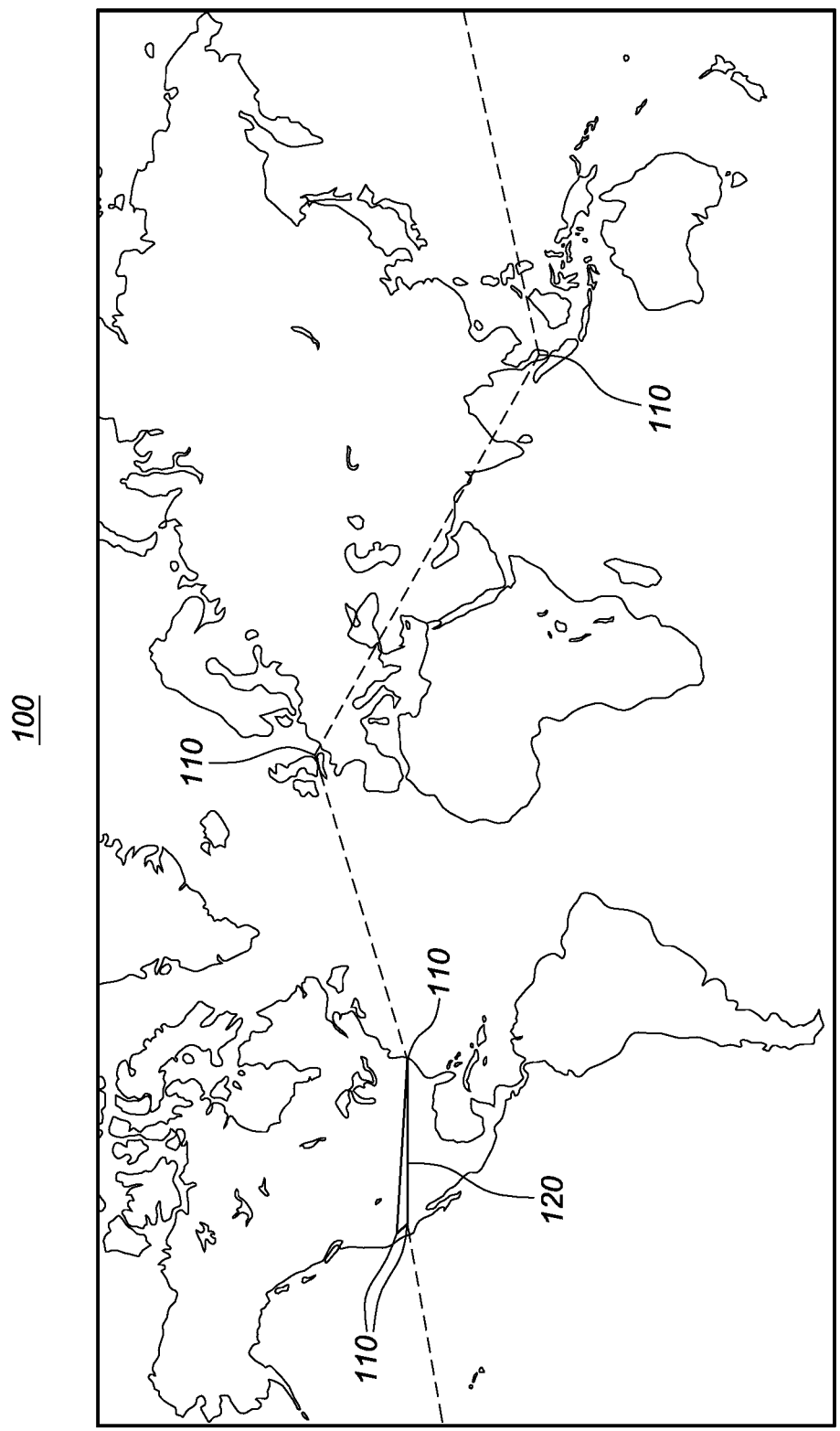
FIG. 2 is an exemplary top-level drawing illustrating another alternative embodiment of the data storage and transfer system of FIG. 1A, wherein the data storage and transfer system comprises a plurality of points of presence that are distributed around the world.

The embodiment of the data storage and transfer system 100 of FIG. 1A is shown as comprising a plurality of points of presence (POPs) 110 that are connected by, and communicate via, a communication connection 120. The points of presence 110 can be disposed at multiple geographic locations. Preferably, the points of presence 110 are geographically remote and can be distributed at any suitable geographic locations around the world as illustrated in FIG. 2. Each of the points of presence 110 includes proprietary networking equipment that enables extremely fast transport between the multiple geographic locations, such as geographic regions including North America, Europe and Asia. Exemplary geographic locations can include geographic locations disposed at a border (or coast) and/or inland (or interior) of a selected geographic region.

Returning to FIG. 1A, each point of presence 110 can include an object/file store system 112, a storage array system 114, and a Remote Direct Memory Access over Converged Ethernet (RoCE)/Hypertext Transfer Protocol (HTTP) array system 116. The points of presence 110 can communicate with the communication connection 120 directly and/or, as illustrated in FIG. 1A, via one or more intermediate systems, such as a Wide Area Network (WAN) system 118. Each point of presence 110 can be associated with a respective Wide Area Network system 118, which can be separate from, and/or at least partially integrated with, the relevant point of presence 110.

Each Wide Area Network system 118 can enable a user to remote mount compute to data, in geographically diverse locations. The Wide Area Network systems 118 thereby can eliminate a need to transfer entire datasets for individual runs. This functionality can provide a significant improvement in price and/or performance for distributed Enterprise Performance Computing (EPC) workloads and/or can solve some fundamental data sovereignty and privacy challenges, such as General Data Protection Regulation (GDPR) and/or Health Insurance Portability and Accountability Act (HIPPA). In one embodiment, the Wide Area Network systems 118 can provide data acceleration based upon a hardware and/or software solution extending InfiniBand (IB) and RDMA over converged Ethernet (RoCE) from a Local Area Network (LAN) of each point of presence 110 to the WAN supported by the communication connection 120 and/or utilizing other techniques to eliminate latency-induced bandwidth limitations associated with standard TCP/IP. Additionally and/or alternatively, the points of presence 110 and/or the communication connection 120 can support Layer 2 (Ethernet and IB) and/or Layer 3 (TCP/IP) connections. By introducing no additional latency, the data storage and transfer system 100 can offer up to 95% (or more) bandwidth utilization independent of distance while supporting up to 10 Gbps (or higher) service.

The RoCE/HTTP array system 116 can be configured to communicate with, and exchange data with, the object/file store system 112 and/or the storage array system 114. In one embodiment, the object/file store system 112 can provide a distributed file and/or object storage solution. The object/file store system 112, for example, can include a user-accessible policy manager to control one or more (preferably all) aspects of data storage, distribution, access, and/or persistence. The points of presence 110 advantageously can provide orders of magnitude reduction in data transport times versus traditional protocols, such as the Transmission Control Protocol/Internet Protocol (TCP/IP) protocols. Additionally and/or alternatively, the points of presence 110 can support multiple and/or easy methods to on-ramp to (and/or off-ramp from) the external network resources 200, greatly improving user experience. The data storage and transfer system 100 thereby can provide a parallel file system and object storage system that supports geographic replication and/or erasure coding for maintaining system resiliency and reliability.

Figure 1B:
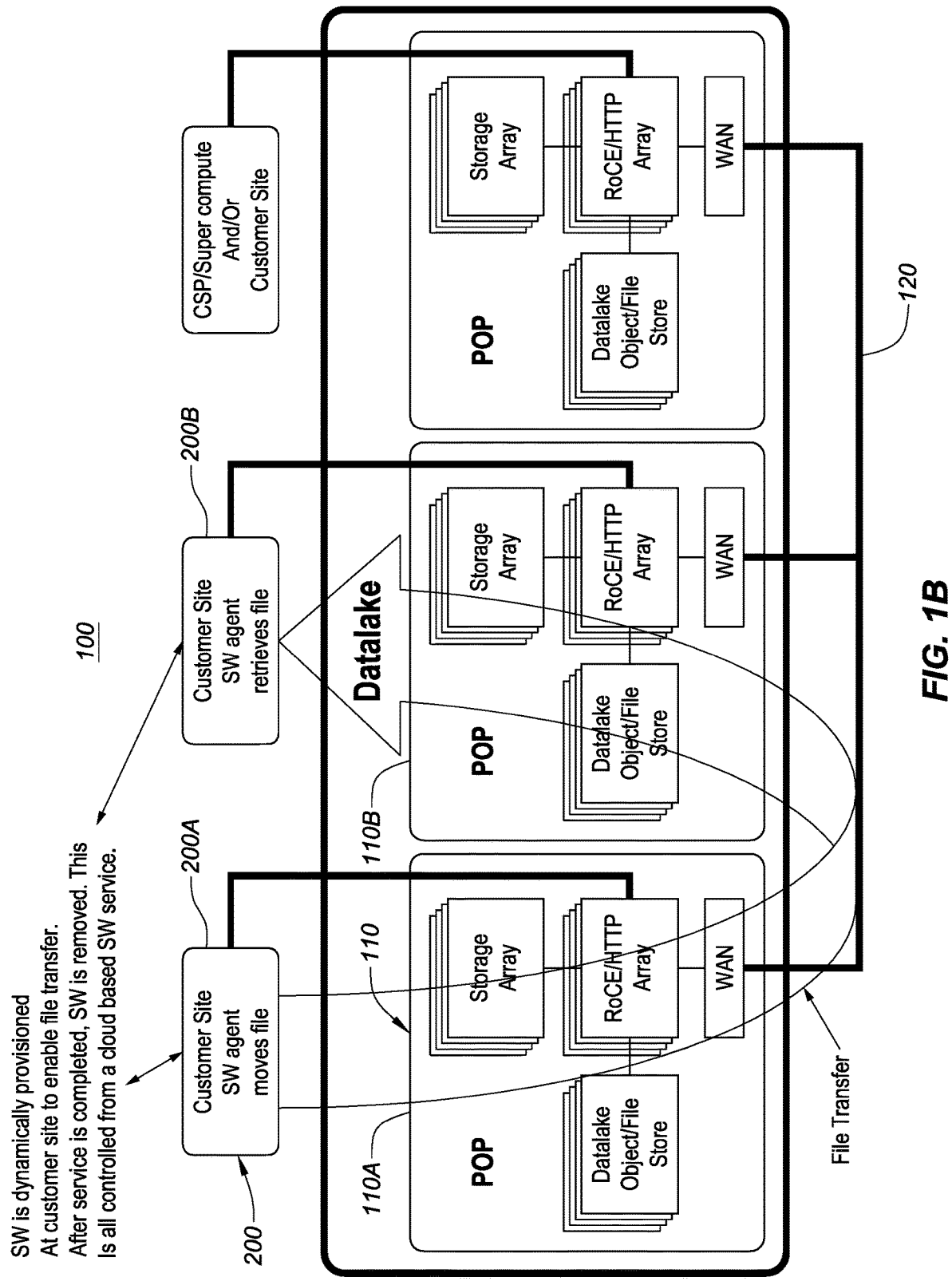
FIG. 1B is an exemplary top-level drawing illustrating an alternative embodiment of the data storage and transfer system of FIG. 1A, wherein the data storage and transfer system is enabled to transfer a selected file.

Turning to FIG. 1B, the data storage and transfer system 100 is shown as being enabled to provide a cloud-based service for facilitating transfer a selected file from a source network resource (or customer/user site) 200A to a destination network resource (or customer/user site) 200B. When enabled by a user, the data storage and transfer system 100 can download a containerized software engine to both network resources 200A, 200B for transferring the selected file through the fabric of the data storage and transfer system 100 from the source network resource 200A to the destination network resource 200B. The user need only interact with the data storage and transfer system 100 through a simple web user interface.

The data storage and transfer system 100 thereby can transfer files from the source network resource 200A to the destination network resource 200B in a manner that is controlled remotely, such as via the cloud. Additionally and/or alternatively, the network resources 200A, 200B can comprise third party sites, such as cloud service providers. In one embodiment, the data storage and transfer system 100 can utilize a containerized version of the file transfer software that can be dynamically downloaded to the network resource 200 to perform the file transfer function and then can be deleted.

The data storage and transfer system 100 can include an ability to begin accessing the file at the destination network resource 200B prior to the complete transfer of the file. Further information about the file processing is set forth in U.S. patent application Ser. No. 16/002,808, filed on Jun. 7, 2018, the disclosure of which is incorporated herein by reference in its entirety and for all purposes. The software that is installed at the network resource 200 can include file transfer acceleration technology to reduce the time taken to move the file across long distances.

Advantageously, the data storage and transfer system 100 can be configured to dynamically provision a variable bandwidth on the long distance accelerated fabric of the data storage and transfer system 100 in selected embodiments.

The data storage and transfer system 100 can dynamically provision the fabric bandwidth in real time and/or based upon one or more predetermined criteria. Exemplary predetermined criteria can include, but are not limited to, customer need, fabric bandwidth availability and/or at least one preselected priority policy. A preselected priority policy, for instance, can establish a priority level on a per-customer basis and/or between multiple customers based upon a business criterion. The priority levels can be uniform and/or different among a selected group of customers. In other words, two or more customers can share a common priority level; whereas, another customer can have a different priority level from the common priority level of the two or more customers.

For example, a selected customer can wish to transfer 1PB of data from a source network resource 200A to a destination network resource 200B that is located distally from the source network resource 200A (collectively shown in FIG. 1B) via the data storage and transfer system 100. The 1PB of data can be transferred from the source network resource 200A to the destination network resource 200B in one day if the long distance accelerated fabric of the data storage and transfer system 100 has a first available bandwidth of 100 Gbps. Alternatively, the data can be transferred from the source network resource 200A to the destination network resource 200B in ten days if the long distance accelerated fabric has a second available bandwidth of 10 Gbps. The data storage and transfer system 100 can dynamically provision the fabric bandwidth to provide the selected customer with access to the long distance accelerated fabric with the first available bandwidth for a first predetermined period of time and/or the second available bandwidth for a second predetermined period of time for transferring the data. The data storage and transfer system 100 can reduce or otherwise adjust the priority of data transfers by other customers during the first and second predetermined periods of time and route the data transfers of these other customers through other channels of the long distance accelerated fabric based upon the predetermined criteria. For instance, the selected customer can be provided with access to the long distance accelerated fabric of the data storage and transfer system 100 with the first available bandwidth of 100 Gbps for one day while other traffic is throttled back.

Although described as supporting first and second available bandwidths for purpose of illustration only, the long distance accelerated fabric of the data storage and transfer system 100 can support any predetermined number of available bandwidths. The predetermined number of available bandwidths can be available for any respective predetermined period of time, and the data storage and transfer system 100 can dynamically provision the predetermined number of available bandwidths of the long distance accelerated fabric in any suitable manner based upon, for example, the predetermined criteria.

Although various implementations are discussed herein and shown in the figures, it will be understood that the principles described herein are not limited to such. For example, while particular scenarios are referenced, it will be understood that the principles described herein apply to any suitable type of computer network or other type of computing platform, including, but not limited to, a Local Area Network (LAN), a Wide Area Network (WAN), a Wireless Local Area Network (WLAN), a Metropolitan Area Network (MAN) and/or a Campus Area Network (CAN).

Accordingly, persons of ordinary skill in the art will understand that, although particular embodiments have been illustrated and described, the principles described herein can be applied to different types of computing platforms. Certain embodiments have been described for the purpose of simplifying the description, and it will be understood to persons skilled in the art that this is illustrative only. It will also be understood that reference to a "server," "computer," "network component" or other hardware or software terms herein can refer to any other type of suitable device, component, software, and so on. Moreover, the principles discussed herein can be generalized to any number and configuration of systems and protocols and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of particular inventions.

What is claimed is:

1. A data storage and transfer method for performing fast data transfers, comprising:
    dynamically provisioning a long-distance accelerated fabric having a variable bandwidth based upon a first need of a first customer associated with a first source network resource;
    transmitting a first data set from the first source network resource to a destination network resource via the dynamically-provisioned long-distance accelerated fabric;
    transmitting a second data set from a second source network resource associated with a second customer to the destination network resource via the dynamically-provisioned long-distance accelerated fabric;
    establishing a first preselected priority policy that allocates a first available bandwidth of the dynamically-provisioned long-distance accelerated fabric to the first customer during a first predetermined time interval and allocates a second available bandwidth of the dynamically-provisioned long-distance accelerated fabric to the first customer during a second predetermined time interval; and
    adjusting a second preselected priority policy of the second customer during the first and second predetermined time intervals based upon the first preselected priority policy,
    wherein said transmitting the second data set includes transmitting the second data set from the second source network resource to the destination network resource during the first and second predetermined time intervals via a selected channel of the dynamically-provisioned long-distance accelerated fabric that is not allocated to the first customer in accordance with the first preselected priority policy, and
    wherein the destination network resource is geographically remote from the first source network resource.

2. The data storage and transfer method of claim 1, wherein said dynamically provisioning comprises dynamically provisioning the long-distance accelerated fabric in real time.

3. The data storage and transfer method of claim 1, wherein said dynamically provisioning comprises dynamically provisioning the long-distance accelerated fabric based upon a second need of the second customer associated with the second source network resource.

4. The data storage and transfer method of claim 3, further comprising establishing a first preselected priority policy for the first customer, establishing a second preselected priority policy for the second customer or establishing a composite preselected priority policy for the first and second customers.

5. The data storage and transfer method of claim 3, further comprising establishing a first preselected priority policy that allocates a first available bandwidth of the dynamically-provisioned long-distance accelerated fabric to the first customer during a first predetermined time interval and allocates a second available bandwidth of the dynamically-provisioned long-distance accelerated fabric to the first customer during a second predetermined time interval.

6. The data storage and transfer method of claim 1, wherein said transmitting the first data set includes transmitting the first data set from the first source network resource to the destination network resource via the first available bandwidth of the dynamically-provisioned long-distance accelerated fabric during the first predetermined time interval and via the second available bandwidth of the dynamically-provisioned long-distance accelerated fabric during a second predetermined time interval.

7. The data storage and transfer method of claim 1, wherein said adjusting the second preselected priority policy comprises reducing the second preselected priority policy of the second customer.

8. The data storage and transfer method of claim 1, further comprising adjusting a third preselected priority policy of a third customer during the first and second predetermined time intervals based upon the first and second preselected priority policies and transmitting a third data set from a third source network resource associated with the third customer to the destination network resource during the first and second predetermined time intervals via a second selected channel of the dynamically-provisioned long-distance accelerated fabric that is not allocated to the first and second customers in accordance with the first and second preselected priority policies.

9. The data storage and transfer method of claim 8, wherein said adjusting the third preselected priority policy comprises reducing the third preselected priority policy of the third customer.

10. A computer program product for performing fast data transfers, the computer program product being encoded on one or more non-transitory machine-readable storage media and comprising:
instruction for dynamically provisioning a long-distance accelerated fabric having a variable bandwidth based upon a first need of a first customer associated with a first source network resource;
instruction for transmitting a first data set from the first source network resource to a destination network resource via the dynamically-provisioned long-distance accelerated fabric;
instruction for transmitting a second data set from a second source network resource associated with a second customer to the destination network resource via the dynamically-provisioned long-distance accelerated fabric;
instruction for establishing a first preselected priority policy that allocates a first available bandwidth of the dynamically-provisioned long-distance accelerated fabric to the first customer during a first predetermined time interval and allocates a second available bandwidth of the dynamically-provisioned long-distance accelerated fabric to the first customer during a second predetermined time interval; and
instruction for adjusting a second preselected priority policy of the second customer during the first and second predetermined time intervals based upon the first preselected priority policy,
wherein said instruction for transmitting the second data set includes instruction for transmitting the second data set from the second source network resource to the destination network resource during the first and second predetermined time intervals via a selected channel of the dynamically-provisioned long-distance accelerated fabric that is not allocated to the first customer in accordance with the first preselected priority policy, and
wherein the destination network resource is geographically remote from the first source network resource.

11. A system for performing fast data transfers, comprising:
a long-distance accelerated fabric having a variable bandwidth; and
a data storage and transfer system, including a processor, a memory or a combination thereof, for dynamically provisioning said accelerated fabric based upon a first need of a first customer associated with a first source network resource, transmitting a first data set from a the first source network resource to a destination network resource via said dynamically-provisioned long-distance accelerated fabric, transmitting a second data set from a second source network resource associated with a second customer to the destination network resource via the dynamically-provisioned long-distance accelerated fabric, establishing a first preselected priority policy that allocates a first available bandwidth of the dynamically-provisioned long-distance accelerated fabric to the first customer during a first predetermined time interval and allocates a second available bandwidth of the dynamically-provisioned long-distance accelerated fabric to the first customer during a second predetermined time interval and adjusting a second preselected priority policy of the second customer during the first and second predetermined time intervals based upon the first preselected priority policy,
wherein said data storage and transfer system is configured to transmit the second data set from the second source network resource to the destination network resource during the first and second predetermined time intervals via a selected channel of the dynamically-provisioned long-distance accelerated fabric that is not allocated to the first customer in accordance with the first preselected priority policy, and
wherein the destination network resource is geographically remote from the source network resource.

12. The system of claim 11, wherein said data storage and transfer system includes a first array system for receiving the first data set from the first source network resource and a second array system for receiving the received data set from said first array system via said dynamically-provisioned long-distance accelerated fabric and transmitting the received data set to the destination network resource.

13. The system of claim 12, wherein said first array system is geographical proximate to the first source network resource, and wherein said second array system is geographical proximate to the destination network resource.

14. The system of claim 11, said data storage and transfer system is configured to dynamically provision the long-distance accelerated fabric based upon a second need of the second customer associated with the second source network resource, a fabric bandwidth availability of the long-distance accelerated fabric, a preselected priority policy or a combination thereof.

15. The system of claimer 14, wherein said data storage and transfer system is configured to allocate a first available bandwidth of said dynamically-provisioned long-distance accelerated fabric for transmitting the first data set to the destination network resource during a first predetermined time interval and to allocate a second available bandwidth of said dynamically-provisioned long-distance accelerated fabric for transmitting the first data set to the destination network resource during a second predetermined time interval occurring after the first predetermined time interval.

16. The system of claim 15, wherein said dynamically-provisioned long-distance accelerated fabric includes a plurality of communication channels, said data storage and transfer system allocating a first communication channel of said dynamically-provisioned long-distance accelerated fabric for transmitting the first data set during the first predetermined time interval, a second communication channel of said dynamically-provisioned long-distance accelerated fabric for transmitting the first data set during the second predetermined time interval and a third communication channel of said dynamically-provisioned long-distance accelerated fabric for transmitting the second data set during the first and second predetermined time intervals.

17. The data storage and transfer method of claim 1, wherein said dynamically provisioning comprises dynamically provisioning the long-distance accelerated fabric based upon a fabric bandwidth availability of the long-distance accelerated fabric, a preselected priority policy or a combination thereof.

18. The computer program product of claim 10, wherein said instruction for dynamically provisioning includes instruction for dynamically provisioning the long-distance accelerated fabric based upon a second need of the second customer associated with the second source network resource.

19. The computer program product of claim 18, further comprising instruction for establishing a first preselected priority policy for the first customer, instruction for establishing a second preselected priority policy for the second customer or instruction for establishing a composite preselected priority policy for the first and second customers, or further comprising instruction for establishing a first preselected priority policy that allocates a first available bandwidth of the dynamically-provisioned long-distance accelerated fabric to the first customer during a first predetermined time interval and allocates a second available bandwidth of the dynamically-provisioned long-distance accelerated fabric to the first customer during a second predetermined time interval.

20. The system of claimer 14, wherein said data storage and transfer system is configured to establish a first preselected priority policy for the first customer, establish a second preselected priority policy for the second customer or establish a composite preselected priority policy for the first and second customers.

\* \* \* \* \*